(12) United States Patent
Perrier

(10) Patent No.: US 7,956,731 B2
(45) Date of Patent: Jun. 7, 2011

(54) HYDROSTATIC-PRESSURE-SENSITIVE ACTUATOR

(75) Inventor: Bernard Perrier, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 599 days.

(21) Appl. No.: 12/088,917

(22) PCT Filed: Oct. 3, 2006

(86) PCT No.: PCT/EP2006/067000
§ 371 (c)(1),
(2), (4) Date: Apr. 1, 2008

(87) PCT Pub. No.: WO2007/039607
PCT Pub. Date: Apr. 12, 2007

(65) Prior Publication Data
US 2010/0148951 A1    Jun. 17, 2010

(30) Foreign Application Priority Data

Oct. 6, 2005 (FR) ..................................... 05 10297

(51) Int. Cl.
*B60C 23/00* (2006.01)
*G08B 21/00* (2006.01)

(52) U.S. Cl. ...... 340/447; 340/442; 340/445; 340/686.1
(58) Field of Classification Search .................. 340/442, 340/445, 447, 686.1, 689
See application file for complete search history.

(56) References Cited

U.S. PATENT DOCUMENTS

| 3,665,388 | A  | * | 5/1972  | Johnsen ......................... 340/443 |
| 5,663,496 | A  |   | 9/1997  | Handfield et al. ........... 73/146.5 |
| 5,742,984 | A  |   | 4/1998  | Baibak et al. .................. 24/20 S |
| 6,124,787 | A  | * | 9/2000  | Isakov et al. .................. 340/448 |
| 6,486,771 | B1 |   | 11/2002 | Fuller et al. .................... 340/442 |
| 2004/0094251 | A1 | * | 5/2004 | Strache et al. ............. 152/152.1 |
| 2004/0159158 | A1 | * | 8/2004 | Forster ............................ 73/718 |

FOREIGN PATENT DOCUMENTS

| EP | 0 701 911 A1 | 3/1996 |
| EP | 1 622 220 A1 | 2/2006 |
| GB | 2 016 383 A  | 9/1979 |
| WO | WO 96/15919  | 5/1996 |

* cited by examiner

*Primary Examiner* — Daniel Wu
*Assistant Examiner* — Mark Rushing
(74) *Attorney, Agent, or Firm* — Fitzpatrick, Cella, Harper & Scinto

(57) ABSTRACT

An actuator, designed to be used in a pressurized enclosure, creates a relative movement between two parts, in response to a variation of hydrostatic pressure. The actuator includes a closed-cell foam block fixed to the two parts. The actuator may be used in the deployment of wheel units and antennas inside a cavity formed by a tire and a wheel rim.

18 Claims, 5 Drawing Sheets

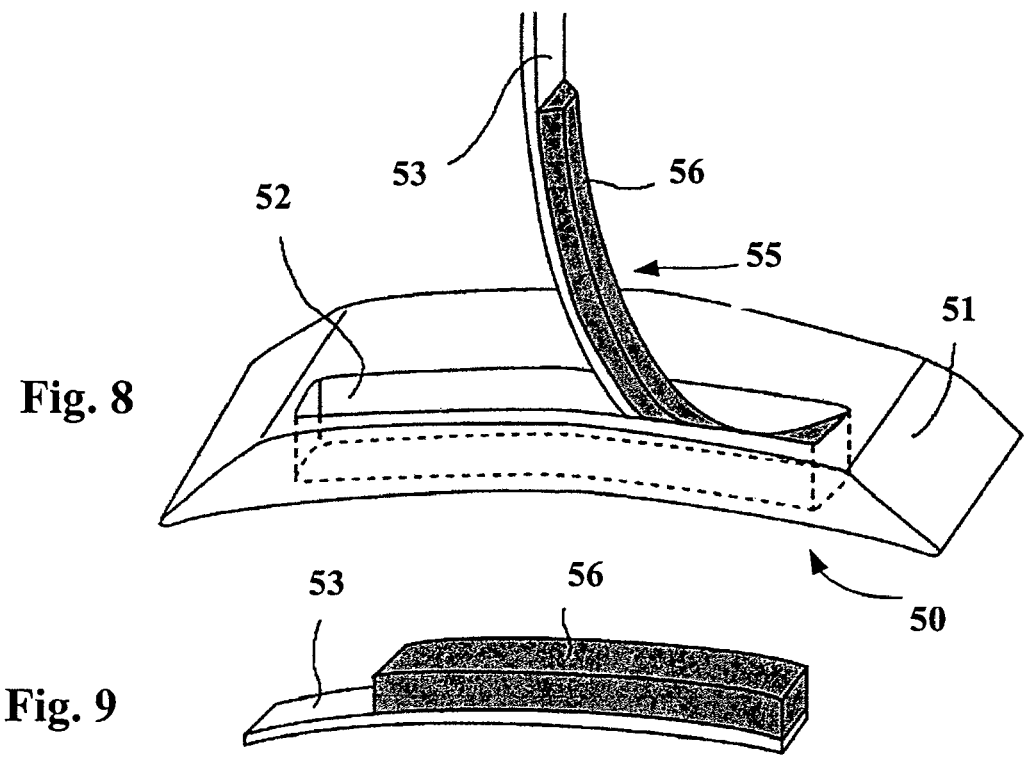
Fig. 8
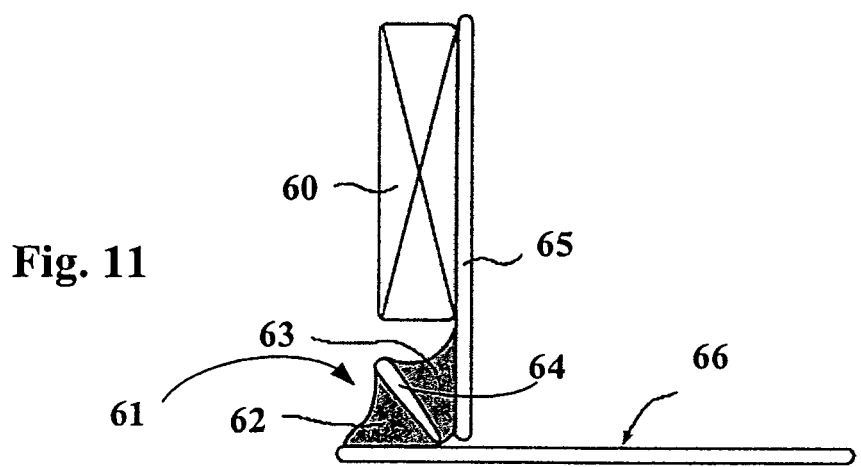
Fig. 9
Fig. 11
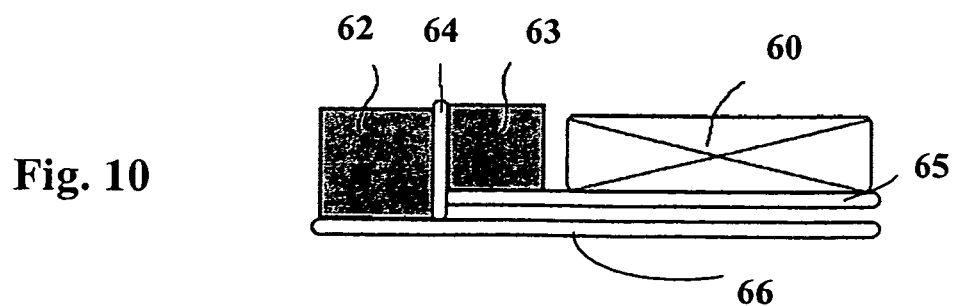
Fig. 10

HYDROSTATIC-PRESSURE-SENSITIVE ACTUATOR

The invention relates to the installation in a vehicle of a device capable of transmitting information from inside the cavity formed by a tire and a wheel rim to a central processing unit located inside the vehicle.

In its principal application, the invention applies in general terms to the installation in a vehicle of the various components of a system—notably but not exclusively—for monitoring the pressures of the tires of this vehicle, such as devices (or "wheel units") designed to acquire, process, and transmit information about the condition of the tires of this vehicle. More precisely, it relates to the fixing, in the cavity formed by the tire and the wheel rim, of devices or wheel units designed to acquire, process, and transmit in particular the inflation pressure values to, in particular, an on-board central processing unit.

Given the fact that it is a "wheel unit", in other words an information capturing, processing, and/or transmitting device designed to be mounted in the above-defined cavity, the problems encountered are of two main types. These are on the one hand problems relating to the rapid rotation of the wheel along the ground (centrifugal force, vibrations, etc.) and on the other hand the constraints of the tire having to be fitted to the wheel rim, or removed when the tire is to be changed.

There is also a limit on the size of the system, and therefore on the power of the batteries. The batteries must however have a very long life, which means that the transmission power cannot be increased at will. On the contrary, it must be kept as weak as possible and in all events remain less than the values authorized by the applicable regulations.

The desired system must therefore withstand centrifugal forces and vibrations, must be small so as not to interfere with the fitting and removing of the tire, must have a transmission power compatible with the power of the energy supply, and must nonetheless transmit the signals satisfactorily.

Many ways have been proposed for fixing or attaching these wheel units. Of these, patent application WO 96/15919 uses wheel units fixed to the wheels by fixing them to the inflation/deflation valve stems of these wheels.

This method however creates a problem when it comes to fitting and removing tires, especially when the valves do not open through a wall in the fitting well.

FIG. 1 of patent EP 0 701 911 shows a wheel rim for an industrial commercial vehicle with, proceeding axially from the outside in, an outer seat, a safety hump, a cylindrical zone for the wheel disc to engage on, and a fitting well. In the case of this rim, the valve is located in the inner wall of the hump and the wheel unit fixed to the valve stem rests against the disc engagement zone, not in the fitting well. This position of the wheel unit makes tire fitting and removal very difficult.

Another fixing method is presented in U.S. Pat. No. 5,742, 984. The wheel unit is located against the outer wall of the fitting well of the wheel rim by an annular flange. This position of the wheel unit is compatible with easy fitting and removal of the tires to and from the wheels, but it is found that the proximity of the metal wall of the wheel significantly interferes with the quality of the radio transmissions between the wheel unit and the central receiver of the monitoring system.

The invention relates to an actuator designed to be used in a pressurized enclosure to create in response to a variation of hydrostatic pressure a relative movement between two parts, the actuator being characterized in that it includes a closed-cell foam block fixed to the two parts.

Such a block includes a collection of closed cells filled with a gas at a pressure greater than atmospheric pressure. Consequently, at atmospheric pressure, all the cells of the block are expanded. However, when placed in a cavity in which the hydrostatic pressure is increasing, the volume of the block will be seen to progressively reduce. The amplitude of the volume decrease is a function of the imposed hydrostatic pressure but also of the volume of the cells of the block. Under a very high hydrostatic pressure, the volume of the block is approximately equivalent to the volume of the walls alone. All these parameters can easily be modified by a person skilled in the art to suit the intended conditions of use.

In a first mode of use, the foam block is located between the two parts and fixed to them by two basically planar and parallel walls. Such an actuator will thus subject the two walls and the two parts to an approximately linear closing movement as the hydrostatic pressure increases; this movement is reversible when the hydrostatic pressure applied to the actuator decreases.

In a second mode of use, the foam block is fixed to the two parts by two basically planar walls defining a pivot axis p and forming an angle alpha with respect to each other.

When the hydrostatic pressure increases, the block of closed-cell foam material of the actuator will contract and thus produce a closing movement of the two faces approximately equivalent to a rotation about the pivot axis p; as in the first embodiment, this rotational movement is reversible when the hydrostatic pressure applied to the actuator decreases.

The angle alpha between the two connecting walls is preferably less than 180°.

The angle alpha is advantageously between 80° and 100°. This will allow excellent mechanical operation of the actuators according to the invention.

In a preferred embodiment, each of the walls is connected to one of the parts by a rigid fixing part, and the two fixing parts are connected to each other by a hinge whose axis of rotation corresponds to the pivot p.

This embodiment enables good control over the relative movement produced in the two parts when the hydrostatic pressure changes. It also improves the mechanical strength of the actuator.

The actuator may also include a locking clip for locking the two parts in a given relative position that occurs at a hydrostatic pressure greater than atmospheric pressure. The advantage of such a clip is that the two parts are maintained in a given deployed position that is stable and independent of subsequent variations in hydrostatic pressure. The clip also maintains this position if the hydrostatic pressure is subsequently decreased, if this is necessary.

The actuators of the invention may also include two closed-cell foam blocks connected by a rigid plate. This greatly increases the amplitude of the movements produced by a pressure change while still retaining good mechanical efficiency.

Such blocks of closed-cell foam material can be made from materials chosen from the group that includes foams containing polyethylene, foams containing polyurethane, foams based on a blend of nitrile rubber, of polyvinyl chloride, of 1,2-polybutadiene, of polyisobutylene, of polyisoprene, and of an elastomeric thermoplastic.

So that the life of the actuators according to the invention is compatible with their use, it is advantageous to treat the surfaces of the cell foam blocks by metallization or application of an impermeable film or coating. Such a treatment or such an application will greatly reduce the residual permeability of the block and thus ensure excellent actuator life.

The invention also relates to an assembly that includes a wheel rim and a device such as a wheel unit or an antenna, which assembly is designed to be mounted in the internal cavity formed by a tire and a wheel rim, and is characterized in that the device is fixed to the wheel rim by an actuator according to the invention.

In a preferred embodiment, the assembly including the wheel rim and the device is such that the device is designed to have two different positions depending on whether the cavity formed by a tire and the wheel rim is or is not pressurized:

at zero relative pressure, the device is located in a fitting well of the wheel rim which serves as its "housing" and thus permits easy fitting of the tire to the wheel rim; and at nominal inflation pressure P, or service pressure, the actuator is compressed and the device is extended out radially from the fitting well and is thus deployed.

The device is preferably fixed to the wheel rim by an actuator that includes a locking clip.

The invention also relates to a device, such as a wheel unit, designed to be located and fixed in the internal cavity formed by a tire and a wheel rim to acquire, process, and/or transmit information about the condition of the tire. The device includes a module and an antenna, and the device is characterized in that the antenna is located externally relative to the module and is connected to the module by an actuator according to the invention.

The actuator is preferably fixed on the one hand to one end of the antenna and on the other hand to the module.

The invention also relates to a device, such as a wheel unit, that includes a module and an antenna with an inner wall adjacent to the module and an outer wall, the antenna being fixed to the module at one end. The device is characterized in that the outer wall of the antenna is covered for part of its length by an elongate block or elongate layer of closed-cell foam material that deforms under the service pressure P, thereby deploying the antenna.

The antenna may consist of a thin cable or wire embedded in a plastic film, the assembly being flexible along its length.

In an advantageous embodiment, the profile of the closed-cell foam rubber layer has a thickness that decreases progressively from the end connected to the module to the free end. The curvature adopted by the antenna is thus at its greatest in the vicinity of the module.

Other features and advantages of the invention will be understood more clearly on reading the following description and referring to the attached drawing, in which:

FIGS. 1 (*a*) and (*b*) are simplified diagrams of a first actuator according to an embodiment of the invention;

Figure 3:
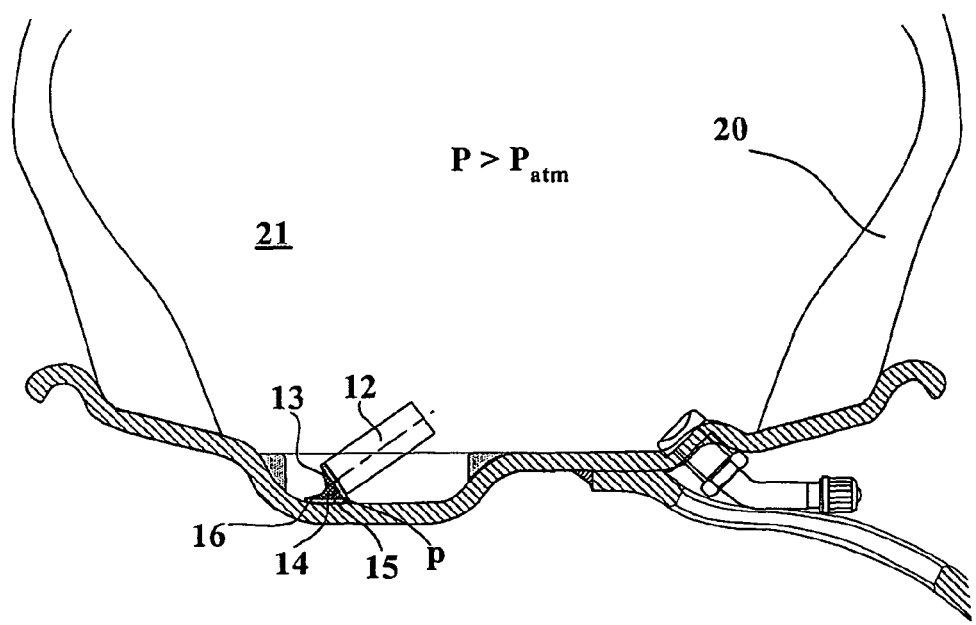
FIG. 3 is similar to FIG. 2, with the unit deployed at the service pressure P inside the tire cavity.
Figure 4:
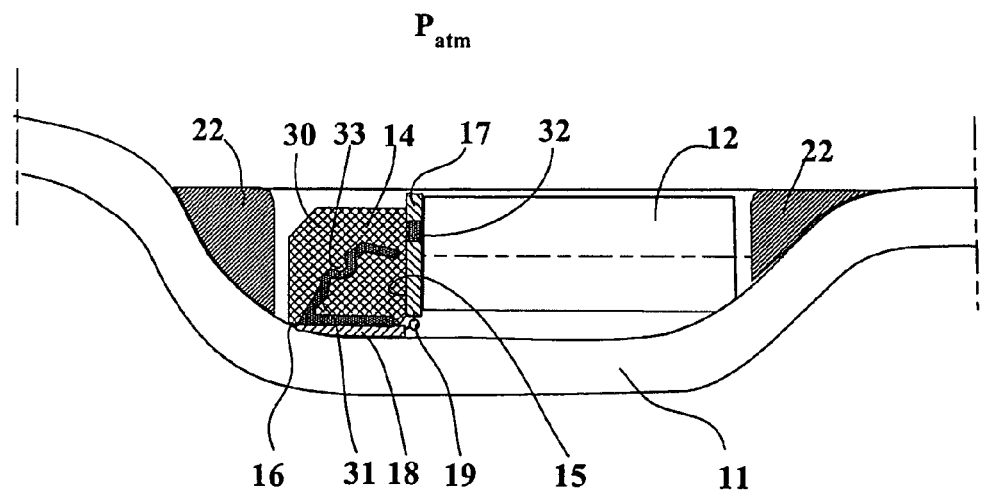
Figure 5:
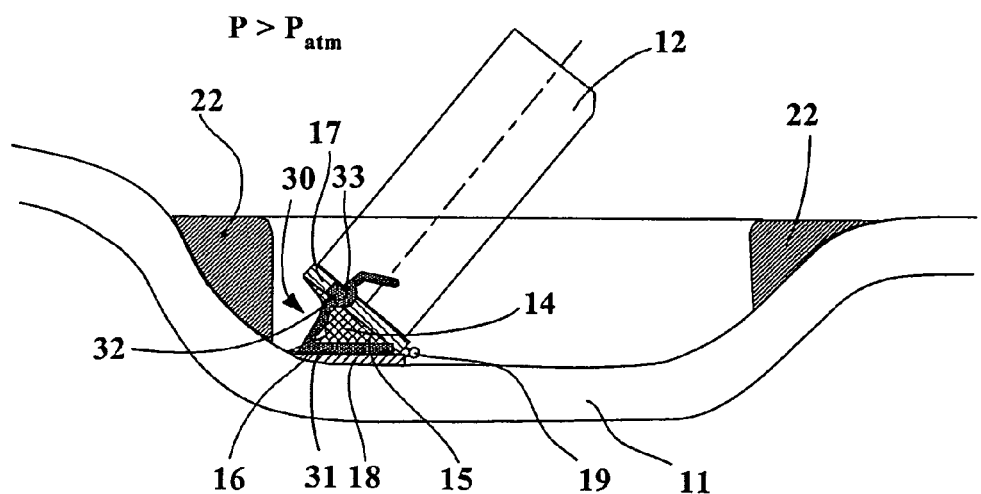
Figure 6:
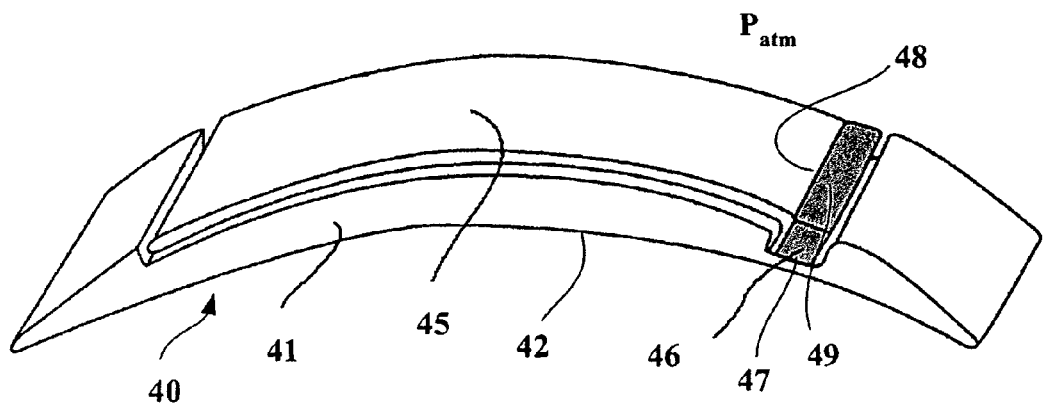
Figure 7:
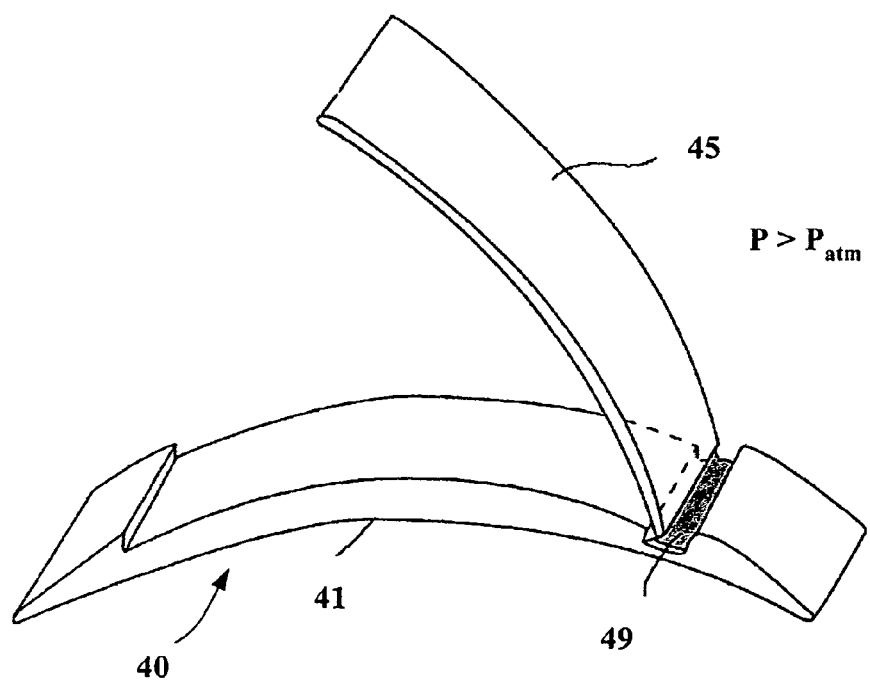

FIG. 4, similar to FIG. 3, shows an actuator with a locking clip in the folded position;

FIG. 5 shows the same assembly as in FIG. 4 in the deployed position with the unit placed in the circumferential direction;

FIG. 6 shows, in perspective, a first embodiment of a wheel unit with an antenna in the folded position;

FIG. 7 shows the same unit as in FIG. 6, with the antenna in the deployed position;

FIG. 8 shows a second embodiment of a wheel unit, with antenna in the deployed position;

FIG. 9 shows the same unit as in FIG. 8, with the antenna in the folded position; and FIGS. 10 and 11 show an actuator according to an embodiment of the invention, with two blocks of closed-cell foam material.

Figure 1:
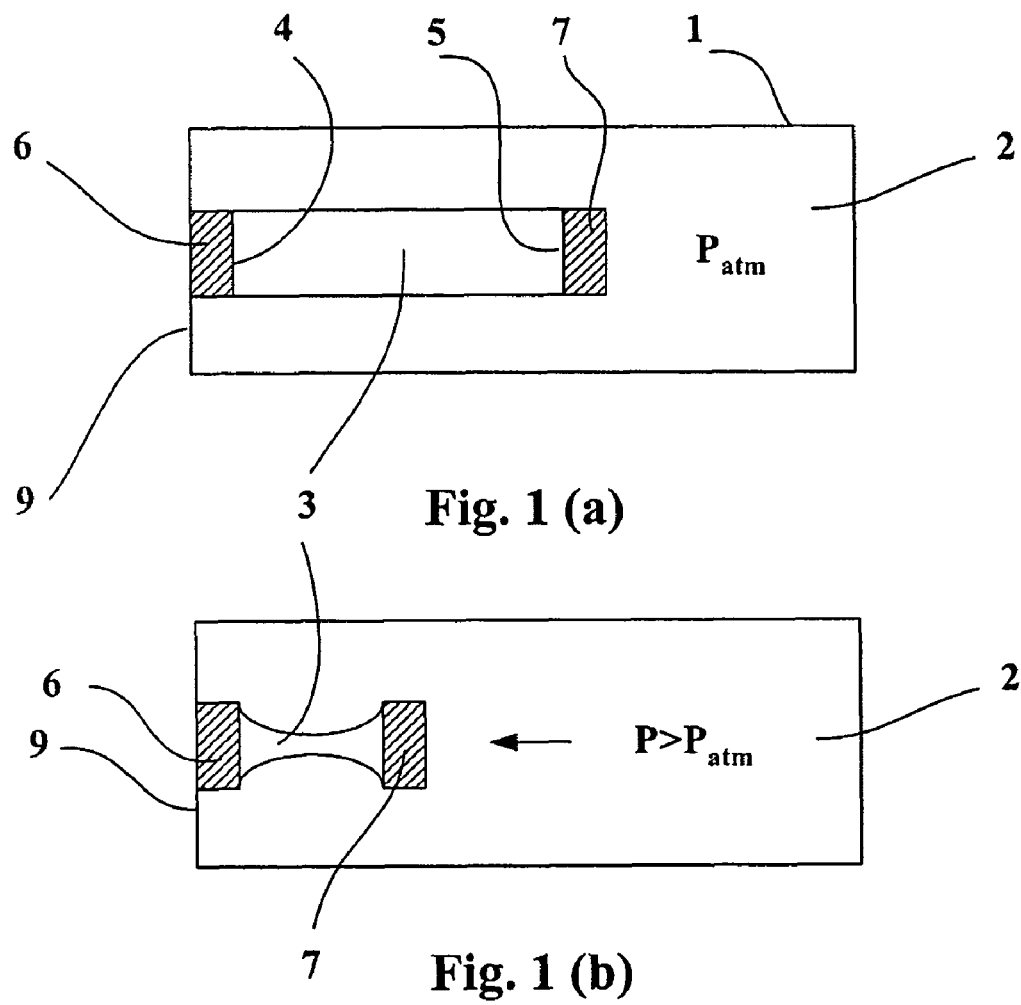

FIG. 1 shows an actuator according to a first embodiment of the invention. The actuator 3 is inside an enclosure 1, which forms a pressurized cavity 2. It comprises a block 3 of closed-cell foam material. The block 3 has two roughly planar and parallel walls 4 and 5. Wall 4 is bonded to a first part 6, which is itself fixed to the wall 9 of the enclosure 1. Wall 5 is bonded to a second part 7, which is free to move inside the cavity of the enclosure.

In FIG. 1 (*a*), the pressure in the cavity 2 is equal to the atmospheric pressure $P_{atm}$. The block 3 of closed-cell foam material is such that the cells have an internal pressure greater than this atmospheric pressure. The block 3 is thus in the rest position.

In FIG. 1 (*b*), the pressure in the cavity 2 is equal to a pressure P greater than atmospheric pressure $P_{atm}$. Under the action of the hydrostatic pressure P, the block 3 has been compressed and part 7 has moved towards part 8 in the direction indicated by the arrow. The movement produced by this actuator 3 is approximately a translational movement. This movement is reversible depending on the hydrostatic pressure in the cavity 2.

The figures that follow take as examples actuators located in the cavity formed by a tire and a wheel rim.

Figure 2:
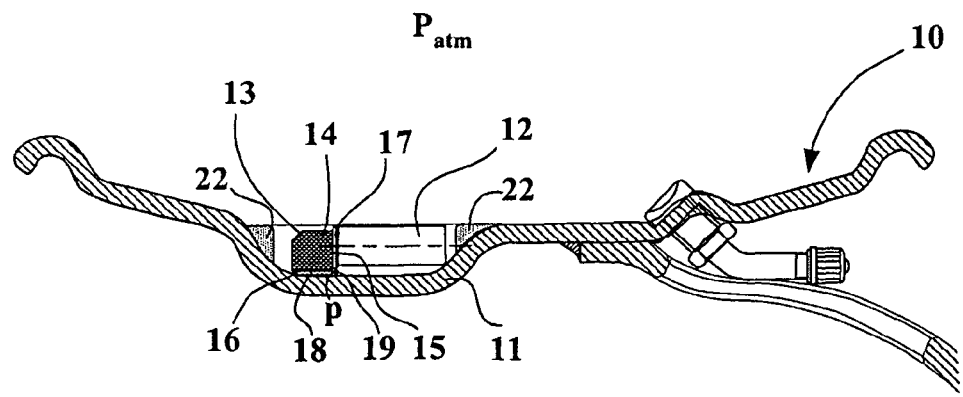
FIG. 2 is an axial section diagram showing an example of a wheel unit fitted to a vehicle wheel rim at atmospheric pressure.

FIG. 2 shows a wheel rim 10 for a heavy-goods vehicle similar to that indicated in FIG. 1 of patent application EP 0 701 911. This wheel rim has among other things a fitting well 11 in which a wheel unit 12 is fixed by way of an actuator 13.

The actuator 13 consists of: a block 14 of closed-cell foam material; a first fixing part 17 bonded to the wall 15 of the block 14 and fixed to the wheel unit 12; and a second fixing part 18 bonded to the wall 16 of the block 14 and fixed to the radially outer wall of the fitting well 11 of the wheel rim 10. The two fixing parts 17 and 18 are preferably interconnected by a hinge 19, which allows a rotational movement between the two parts. The axis of rotation or pivot p is positioned circumferentially. The hinge thus serves to reinforce the mechanical strength of the actuator 13. The hinge is particularly useful for withstanding the centrifugal loading on the wheel unit as the vehicle rolls along and for withstanding the vibrations to which it is subject.

The block 14 is of basically parallelepiped shape. The two walls 15 and 16 of the block 14 are basically perpendicular and together define a pivot axis p corresponding to the axis of the hinge 19. The fixing part 17 is fixed, for example by adhesive bonding, to one wall of the wheel unit. The fixing part 18 is fixed by any mechanical means (adhesive bonding, riveting, welding, or the like) to the wall of the fitting well 11.

FIG. 2 shows the assembly including the wheel rim 10 and the wheel unit 12 at atmospheric pressure. The block 14 is deployed and is such that the wheel unit is located in the housing formed by the fitting grove 11, which is provided to allow a tire to be fitted to the rim. Also to be seen in FIG. 2 is a component 22 located in the housing formed by the fitting well 11 and designed to accommodate the shape of the fitting well. This component 22 surrounds the wheel unit 12 and the actuator 13, and functions to protect the bead edge of a tire when the tire is being fitted to or removed from the wheel rim 10.

FIG. 3 shows the assembly including the wheel rim 10 and the wheel unit 12, as seen in FIG. 2, when a tire 20 is fitted to the wheel rim 10 and the service pressure P, greater than atmospheric pressure $P_{atm}$, is applied in the cavity 21 formed by the tire and the rim.

The block 14 of the actuator 13 compresses under the action of the hydrostatic pressure P, which makes the wall 15 pivot relative to the wall 16, and raises and deploys the wheel unit 12. The service pressure may be of the order of 5 to 9 bar. Under these conditions, the volume of the block 14 is reduced to practically the volume of the walls of the cells of the foam material of the block. It can be seen that the unit 12 has undergone a rotational movement about the pivot axis p of around 40° to 50°.

This movement allows a substantial part of the unit 12 to move out of the housing formed by the fitting well 11 of the wheel rim and away from the metal wall of the rim 10. The wheel unit 12 usually includes in particular a module and an antenna. This movement allows the antenna to move away from the wall of the wheel rim and very substantially improves the quality of the radio transmissions between the wheel unit and a central processing unit of the system (of which the wheel unit is a part) located inside the vehicle.

FIG. 4 shows, in an enlarged view and at atmospheric pressure, an assembly that includes a wheel rim 10 and a wheel unit 12 connected together by an actuator 30, similar to that of FIGS. 2 and 3, including a locking clip 31. FIG. 5 shows the same assembly at the service pressure P.

The locking clip 31 is connected to the second fixing part 18 fixed to the wall of the wheel rim 10 on the one hand and to the wall 16 of the block 14 on the other. This clip is designed to engage with a projection 32 on the first fixing part 17 fixed to the wheel unit 12 on the one hand and to the wall 15 of the block 14 on the other. The two fixing parts are connected by the hinge 19. As the inflation pressure increases, the block 14 contracts, tending to cause the wall 15 to pivot about the pivot p of the hinge 19 towards the wall 16. At a given pivot angle, the projection 31 engages in a notch 33 in the clip 31, preventing any further rotational movement.

This clip has the advantage of holding the wheel unit in a given stable deployed position that is independent of inflation pressure variations related to the conditions of use of the vehicle (e.g., temperature increases, etc.).

The clip can also keep the unit in the given deployed angular position when the pressure is reduced to atmospheric pressure. It will then be a particular mechanical action, such as that of a tire bead being removed, which will free the actuator.

The clip and the assembly that includes the notch and the projection may also be so designed that, as soon as the pressure falls below a predetermined threshold, the expansive force of the foam material block is greater than the mechanical resistance to of the clip. This will free the projection and allows the wheel unit to rotate towards its housing.

FIGS. 6 and 7 show another aspect of the invention: a wheel unit 40 designed to be located and fixed in the internal cavity formed by a tire and a wheel rim in order to acquire, process, and transmit information about the condition of the tire. This wheel unit 40 includes a module 41 and an antenna 45. As the figures show, the radially inward face 42 of the module has a marked curvature corresponding to the curvature of the wheel rim in the circumferential direction. This module is preferably arranged with its major length oriented in the circumferential direction of the wheel rim. The antenna 45 is arranged externally relative to the module 41 and is connected to the module 41 by an actuator 46 consisting of a block 49 of closed-cell foam material with one wall 47 bonded to the module 41 and one wall 48 bonded to a curved end of the antenna 45. The transverse section of the block 49 is basically rectangular. It could also be triangular. The antenna 45 is usually relatively light, so a reinforcing hinge is unnecessary. However, such a hinge can of course be added if necessary.

FIG. 7 shows the same unit 40 as in FIG. 6 positioned in a cavity pressurized to a pressure above atmospheric pressure, causing the block 49 to contract and deploy the antenna.

FIGS. 8 and 9 show an alternative embodiment of a wheel unit 50 with a module 51 and an antenna 53 that includes an actuator 55 according to an embodiment of the invention.

The antenna 53 is flexible in its length and, at atmospheric pressure, lies in a housing 52 of the module 51. The antenna 53 is covered for a large part of its length by an actuator 55 that includes an elongate closed-cell foam block 56 bonded to the wall of the antenna. When the hydrostatic pressure around the unit 50 rises, the block 56 compresses, thus bending the antenna and deploying it. The antenna may consist of a thin lattice embedded in a very thin plastic film, so that the assembly remains flexible along the length.

The thickness of the layer of closed-cell foam material may decrease progressively from the end of the antenna connected to the module to its other end. The bending forces are a function of the thickness and this variant produces a more pronounced curvature of the part of the antenna that is closest to the end connected to the module.

FIG. 10 shows a device 60, such as a wheel unit, which is connected to an actuator 61 allowing a much greater rotation. This actuator includes, in the rest condition, two blocks 62, 63 of closed-cell foam material of basically parallelepiped shape, interconnected by a rigid plate 64. Each block 62, 63 is bonded to a fixing part 65, 66. The two fixing parts 65, 66 are preferably connected by a hinge. This hinge may or may not be connected to the intermediate rigid plate 64.

Such an actuator permits, as shown in FIG. 11, a rotation under pressure of around 80° to 100°.

The invention is not limited to the examples described and illustrated, and various modifications may be made without departing from its scope defined in the appended claims.

The invention claimed is:

1. An actuator designed to be used in a pressurized enclosure to create in response to a variation of hydrostatic pressure a relative movement between two parts, the actuator comprising a closed-cell foam block fixed to the two parts, wherein the foam block is fixed to the two parts by two basically planar walls defining a pivot axis p and forming an angle alpha with respect to each other.

2. An actuator according to claim 1, wherein the angle alpha is less than 180°.

3. An actuator according to claim 2, wherein the angle alpha is between 80° and 100°.

4. An actuator according to one of claims 1 to 3, wherein each of the walls is connected to one of the parts by a rigid fixing part, and wherein the two fixing parts are connected to each other by a hinge whose axis of rotation corresponds to the pivot p.

5. An actuator according to one of claims 1 to 3, further comprising a locking clip for locking the two parts in a given relative position.

6. An actuator according to one of claims 1 to 3, further comprising a second closed-cell foam block, wherein the two closed-cell foam blocks are connected by a rigid plate.

7. An actuator according to one of claims 1 to 3, wherein the closed-cell foam block is formed from a material chosen from the group that includes foams containing polyethylene, foams containing polyurethane, foams based on a blend of nitrile rubber, of polyvinyl chloride, of 1,2-polybutadiene, of polyisobutylene, of polyisoprene, and of an elastomeric thermoplastic.

8. An actuator according to one of claims 1 to 3, wherein surfaces of the cell foam block are treated by metallization or by application of an impermeable film or coating.

9. An actuator designed to be used in a pressurized enclosure to create in response to a variation of hydrostatic pressure a relative movement between two parts, the actuator comprising a closed-cell foam block fixed to the two parts, wherein the actuator is incorporated in an assembly that includes a device, which assembly is designed to be mounted in an internal cavity formed by a tire and a wheel rim, wherein the device is fixed to the wheel rim by the actuator, and wherein the device is a wheel unit or an antenna.

10. An actuator according to claim 9, wherein the device is designed to have two different positions depending on whether the cavity formed by the tire and the wheel rim is or is not pressurized:
- at zero relative pressure, the device is located in a fitting well of the wheel rim, which serves as a housing for the device and thus permits easy fitting of the tire to the wheel rim; and
- at nominal inflation pressure P, or service pressure, the actuator is compressed and the device is extended out radially from the fitting well and is thus deployed.

11. An actuator according to one of claims 1 to 3, wherein the actuator is connected to a device designed to be located and fixed in the internal cavity formed by the tire and the wheel rim, wherein the device is designed to acquire, process, and/or transmit information about a condition of the tire, wherein the device includes a module and an antenna, with the antenna being located externally relative to the module and being connected to the module by the actuator.

12. An actuator according to claim 11, wherein the actuator is fixed to one end of the antenna.

13. A device designed to be located and fixed in an internal cavity formed by a tire and a wheel rim to acquire, process, and/or transmit information about a condition of the tire, the device comprising:
- a module; and
- an antenna with an inner wall adjacent to the module and an outer wall, the antenna being fixed to the module by one end, wherein the outer wall of the antenna is covered for part of its length by an elongate block or an elongate layer of closed-cell foam material that deforms under a service pressure P, thereby deploying the antenna.

14. A device according to claim 13, wherein the antenna includes a thin cable or a wire embedded in a plastic film, such that the antenna is flexible along a length thereof.

15. A device according to either of claims 13 and 14, wherein the outer wall of the antenna is covered for part of its length by a closed-cell foam rubber layer having a profile such that a thickness decreases progressively from the end fixed to the module to a free end.

16. An actuator according to claim 9, wherein the foam block is fixed to the two parts by two basically planar walls defining a pivot axis p and forming an angle alpha with respect to each other.

17. An actuator according to claim 9, wherein the angle alpha is less than 180°.

18. An actuator according to claim 9, wherein the angle alpha is between 80° and 100°.

* * * * *

UNITED STATES PATENT AND TRADEMARK OFFICE
CERTIFICATE OF CORRECTION

PATENT NO. : 7,956,731 B2  Page 1 of 1
APPLICATION NO. : 12/088917
DATED : June 7, 2011
INVENTOR(S) : Bernard Perrier It is certified that error appears in the above-identified patent and that said Letters Patent is hereby corrected as shown below:

COLUMN 5

Line 4, "of5" should read --of 5--.
Line 48, "resistance to of" should read --resistance of--.

Signed and Sealed this
Eighteenth Day of October, 2011

David J. Kappos
*Director of the United States Patent and Trademark Office*